(No Model.)

F. VON VOIGTLÄNDER.
LENS FOR OPTICAL OR OTHER PURPOSES.

No. 567,326. Patented Sept. 8, 1896.

Witnesses
Jas. J. Maloney.
S. H. Livermore.

Inventor.
Frederick von Voigtländer
by Jos. P. Livermore
Att'y.

UNITED STATES PATENT OFFICE.

FREDERICK VON VOIGTLÄNDER, OF BRUNSWICK, GERMANY.

LENS FOR OPTICAL OR OTHER PURPOSES.

SPECIFICATION forming part of Letters Patent No. 567,326, dated September 8, 1896.

Application filed July 22, 1895. Serial No. 556,808. (No model.)

*To all whom it may concern:*

Be it known that I, FREDERICK VON VOIGTLÄNDER, of Brunswick, Germany, have invented an Improvement in a Lens for Optical and Photographical Purposes, of which the following description, in connection with the accompanying drawings, is a specification, like letters on the drawings representing like parts.

This invention relates to lenses for photographic purposes, the object being to produce a lens that is perfectly corrected for astigmatism while possessing in a high degree the other properties desirable in a photographic lens.

The invention is based upon the well-known law that the astigmatic correction of optical systems for photographic purposes is attained by combining positive and negative lenses in such a manner that one of the cemented surfaces has a converging and the other a diverging action on the rays of light. Lenses embodying these characteristics have been made in which, however, these cemented surfaces were in separate lens combinations, one being in one and the other in the other of the two combinations of a photographic doublet objective.

In accordance with the present invention a single combination or each of the two combinations of a doublet embodies a series of positive and negative lenses, three in number, so combined that one of the cemented surfaces has a converging and the other a diverging action on the rays of light, the said lenses being arranged with the one of least refractive power inclosed between two of greater refractive power than said intermediate lens. This arrangement is of great advantage, as the glass of the lens of least refractive power has hygroscopic properties, and by being inclosed between the two other lenses of the triple combination it is entirely protected from the influence of the atmosphere, thus rendering the lens more effective than when the said hygroscopic glass is exposed, as is the case in certain forms of astigmatic lenses that have been used.

The drawings show several forms of combinations embodying this invention.

Figure 1:
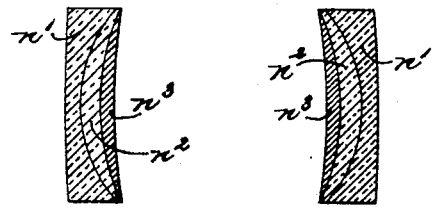

Figure 1 is a sectional view of a symmetrical doublet, each member of which is a triple combination comprising three lenses, each composed of glass differing in refractive power from that of the others, the middle lens $n^2$ being a positive meniscus and composed of glass of the lowest refractive power. The said intermediate lens $n^2$ is inclosed between a positive lens $n^3$ and a negative lens $n'$, the latter (a negative meniscus) being of higher refractive power than the interposed lens $n^2$, but of lower refractive power than the lens $n^3$ (a positive meniscus) at the other side thereof.

Figure 2:
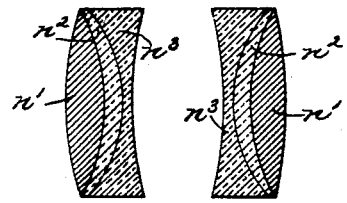

In the combinations of the symmetrical doublet shown in Fig. 2 the relative powers of refraction are the same as in the combinations shown in Fig. 1, but the positive outer lens of highest refractive power is a biconvex lens and the negative outer lens of intermediate refractive power is a biconcave lens.

Figure 3:
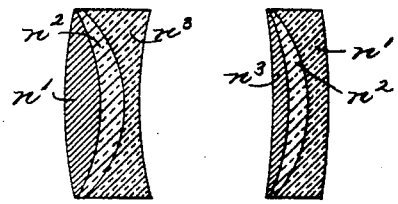

The doublet shown in Fig. 3 is unsymmetrical. One of the combinations (the right-hand one) is of similar character to the combinations shown in Fig. 1, while the other or left-hand one is of similar character to the combinations shown in Fig. 2.

In all of these combinations, which may be used singly or in doublets composed of a symmetrical pair, as shown in Figs. 1 and 2, or of an unsymmetrical pair, as shown in Fig. 3, the combination is composed of two juxtaposed lenses of like name, for example, both positive, and a lens of unlike name to the other two, for example, negative, the juxtaposed lens of like name being one of greater and the other of less refractive power than the lens of unlike name; and in all of these combinations the intermediate lens is a meniscus and is interposed between a positive and negative lens cemented thereto and both of higher refractive power than said meniscus, while the outer lenses in all of the combinations have their outer surfaces curved in the same direction.

I claim—

1. A compound lens consisting of two juxtaposed lenses of like name, and a lens of unlike name combined with one of them, the intermediate lens inclosed between the other two being of least refractive power and the outer lenses inclosing the same being one of intermediate refractive power and the other of highest refractive power, substantially as and for the purpose described.

2. A photographic doublet objective consisting of two compound lenses each composed of two juxtaposed lenses of like name, and a lens of unlike name combined with one of them, the intermediate lens inclosed between the other two being of least refractive power and the outer lenses inclosing the same being one of intermediate refractive power and the other of highest refractive power, substantially as and for the purpose described.

3. A photographic doublet objective consisting of two compound lenses each composed of two juxtaposed lenses two of like name, and one of unlike name combined with one of them, the intermediate lens inclosed between the other two being of least refractive power and the outer lenses being one of intermediate refractive power and the other of highest refractive power, and the outer lenses having their outer surfaces curved in the same direction, substantially as and for the purpose described.

4. A compound lens consisting of three lenses cemented together, the intermediate one of said lenses being a meniscus and of least refractive power, and the outer lenses being one a positive and the other a negative lens of unequal refractive power, substantially as described.

In witness whereof I have hereunto signed my name in the presence of two subscribing witnesses.

FR. VON VOIGTLÄNDER.

Witnesses:
　LEILA TINGLE,
　JULIUS SECKEL.